United States Patent
Ouyang

(10) Patent No.: US 8,283,587 B2
(45) Date of Patent: Oct. 9, 2012

(54) BUTTON STRUCTURE FOR PORTABLE ELECTRONIC DEVICE

(75) Inventor: Zhi-Bin Ouyang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 316 days.

(21) Appl. No.: 12/774,832

(22) Filed: May 6, 2010

(65) Prior Publication Data

US 2011/0155550 A1 Jun. 30, 2011

(30) Foreign Application Priority Data

Dec. 30, 2009 (CN) .......................... 2009 1 0312735

(51) Int. Cl.
*H01H 13/70* (2006.01)
(52) U.S. Cl. ...................................................... 200/345
(58) Field of Classification Search .................. 200/345, 200/341, 329, 51.15, 406, 409
See application file for complete search history.

(56) References Cited

U.S. PATENT DOCUMENTS

| 2006/0081452 A1* | 4/2006 | Yanai et al. ................... 200/406 |
| 2007/0007119 A1* | 1/2007 | Rochon ......................... 200/406 |
| 2007/0056838 A1* | 3/2007 | Tseng ............................ 200/509 |
| 2009/0145736 A1* | 6/2009 | Villain et al. .................. 200/341 |
| 2010/0155215 A1* | 6/2010 | Zuo ................................ 200/550 |
| 2011/0094866 A1* | 4/2011 | Dai ............................... 200/345 |

* cited by examiner

*Primary Examiner* — Edwin A. Leon
(74) *Attorney, Agent, or Firm* — Altis Law Group, Inc.

(57) ABSTRACT

A portable electronic device attached to a housing includes a button, a elastic plate and a switch. The housing defines a through button hole. The button includes an operating portion and a resisting portion. The operating portion extends out of the housing from the button hole. The elastic plate is fixed to the housing. The elastic plate includes an arched portion and defines a guiding hole, the arched portion resists the button. The resisting portion is received in the guiding hole. The resisting portion contacts the switch to form an electronic signal when the button is pressed down. The arched portion of the elastic plate pushes the button to return to original position by a rebounding force when the button is released.

20 Claims, 5 Drawing Sheets

BUTTON STRUCTURE FOR PORTABLE ELECTRONIC DEVICE

BACKGROUND

1. Technical Field

The present disclosure relates to button structures, particularly, to a button structure for use in a portable electronic device.

2. Description of Related Art

Button structures are widely used in portable electronic devices (e.g., mobile phones and personal digital assistants) for facilitating various user operations. A conventional button structure includes a button and two elastic arms. The portable electronic device includes a housing. The housing defines a through hole allowing the button to extend therethrough. The elastic arms connect the button to the housing for generating a rebounding force to push the button to return to original position after being pressed and released. However, the elastic arms are generally made of plastic material and may easily fail.

Therefore, there is room for improvement within the art.

BRIEF DESCRIPTION OF THE DRAWINGS

Many aspects of the button structure can be better understood with reference to the following drawings. The components in the drawings are not necessarily drawn to scale, the emphasis instead being placed upon clearly illustrating the principles of the button structure, in which.

DETAILED DESCRIPTION

Figure 1:
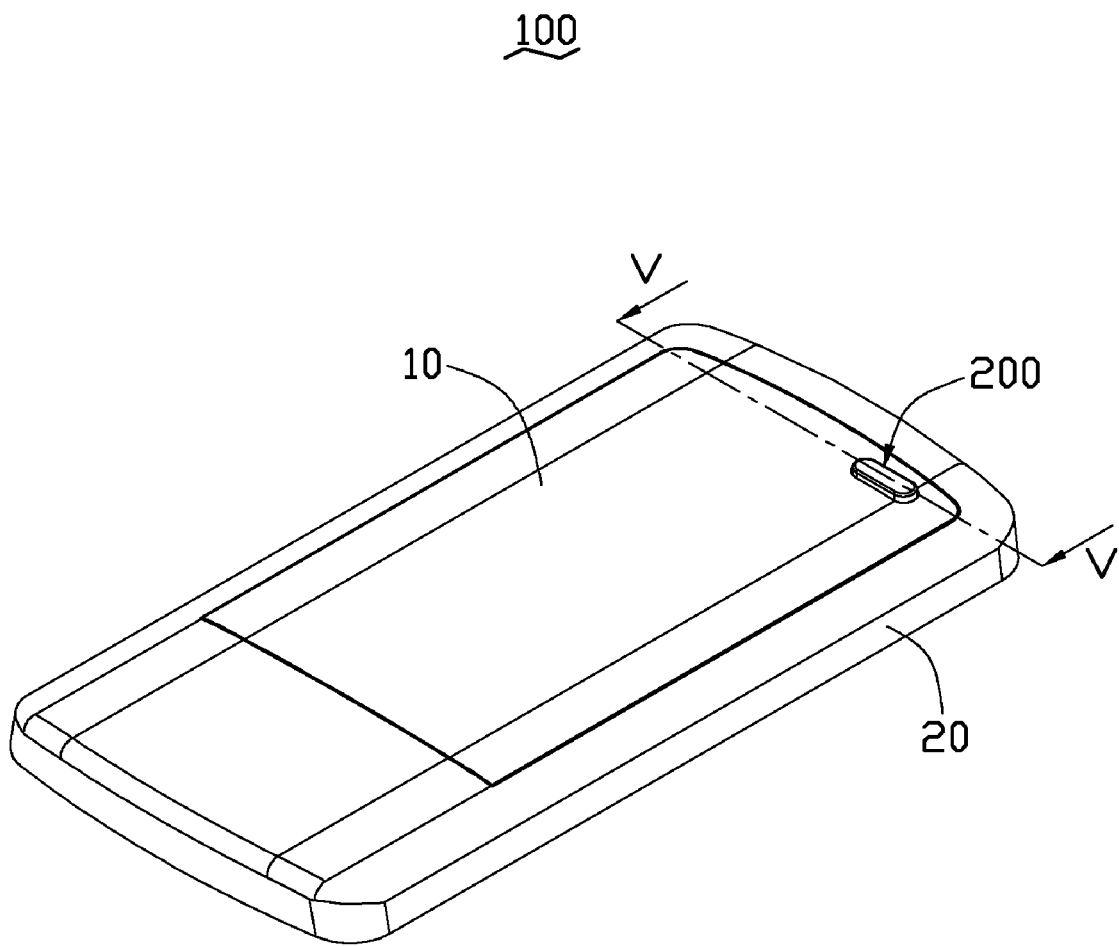
FIG. 1 is an isometric view of a portable electronic device with a button structure, in accordance with an exemplary embodiment.
Figure 2:
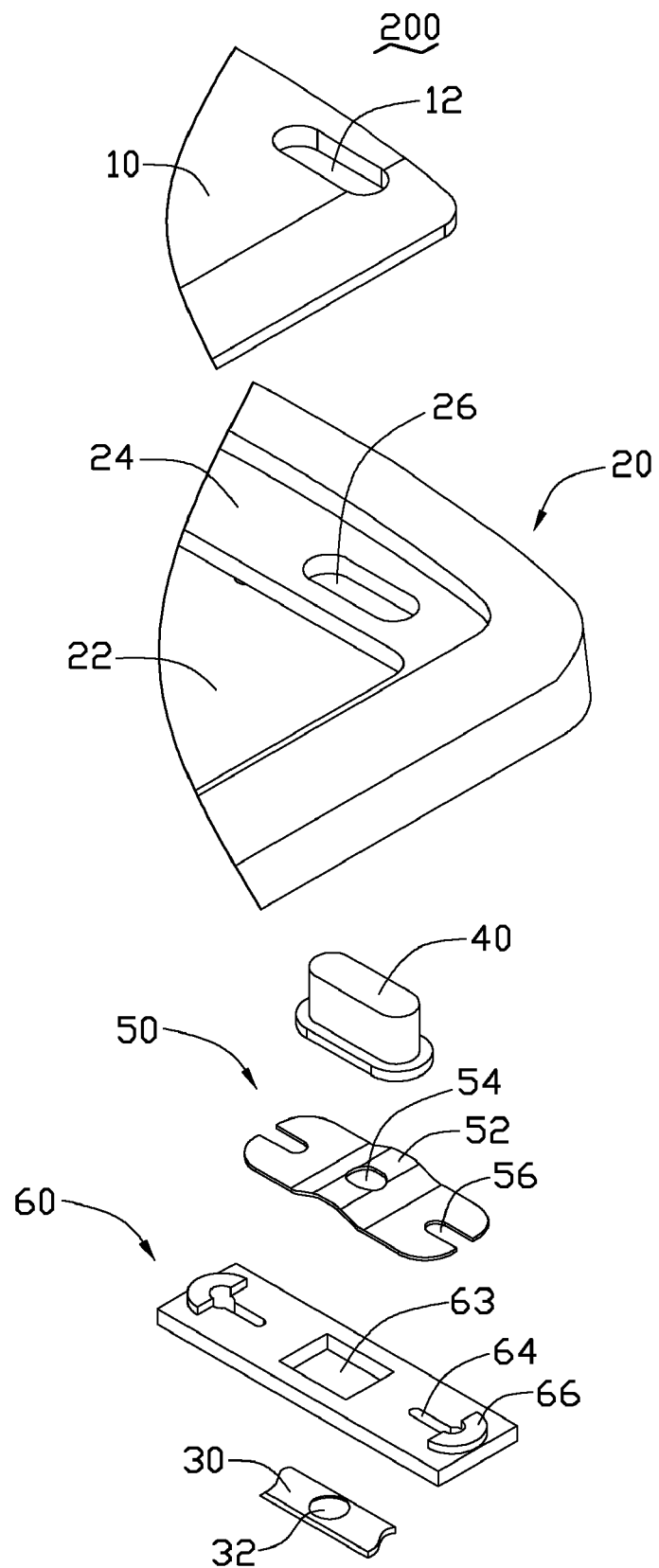
FIG. 2 is an exploded, isometric view of the button structure shown in FIG. 1.
Figure 3:
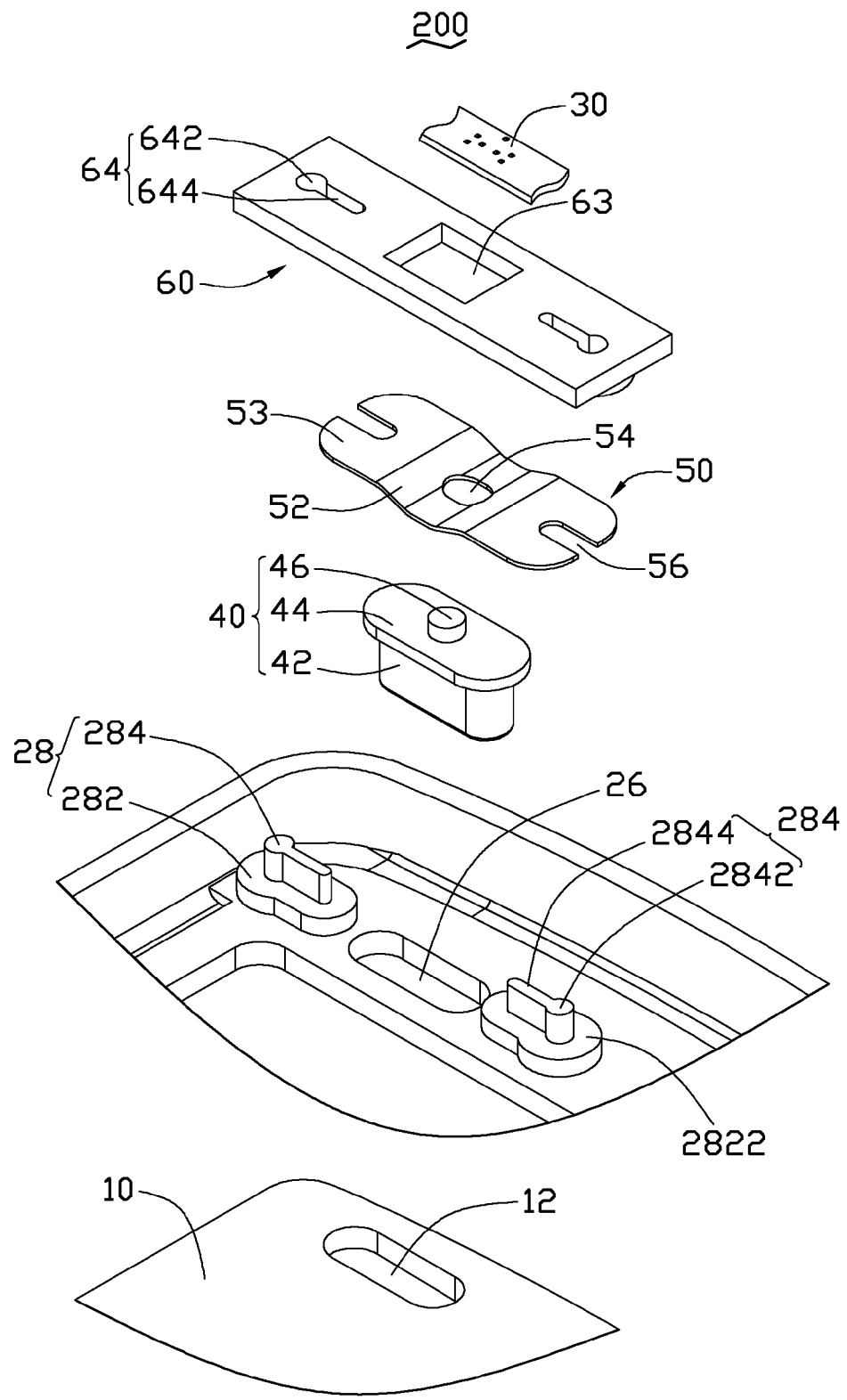
FIG. 3 is similar to FIG. 2, but shown from another aspect.
Figure 4:
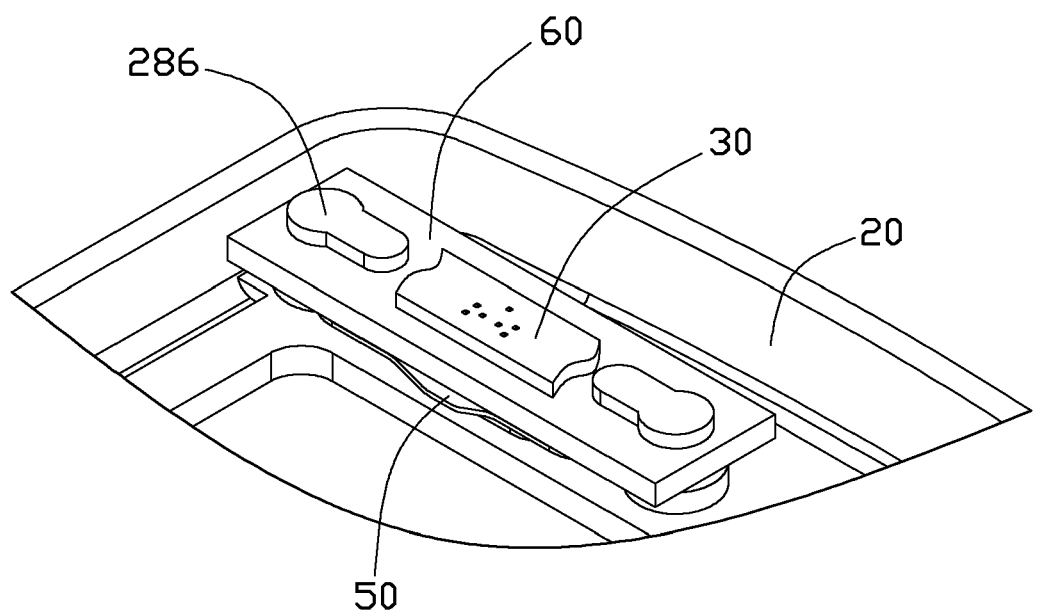
FIG. 4 is an assembled, isometric view of the button structure shown in FIG. 1.
Figure 5:
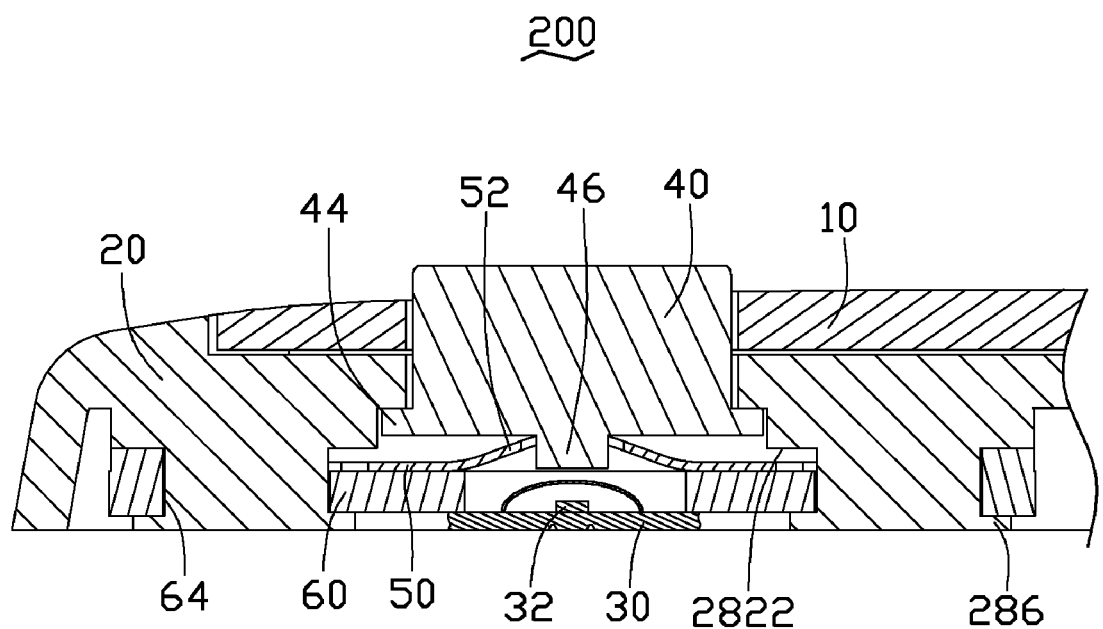
FIG. 5 is a cross sectional view of the assembled button structure along line V-V shown in FIG. 1.

FIG. 1 shows an exemplary embodiment of a portable electronic device 100 with a button structure 200. The device 100 includes a transparent portion designated a window 10 and a housing 20. Also referring to FIGS. 2-3, the button structure 200 includes two latching portions 28 formed on the housing 20, a printed circuit board (PCB) 30 (partially shown), a button 40, an elastic plate 50, and a fixing board 60. The PCB 30 includes a contact switch 32 (shown in FIG. 2).

The window 10 defines a through hole 12 allowing the button 40 to extend therethrough. The through hole 12 is positioned adjacent to one edge of the window 10. The housing 20 defines a cavity 22 for receiving the window 10, and includes a supporting frame 24 in the cavity 22 for supporting the window 10. The supporting frame 24 defines a button hole 26 corresponding to the through hole 12 of the window 10.

The latching portions 28 are formed at an inner side of the main housing 20, positioned at two opposite sides of the button hole 26 correspondingly. In this embodiment, each latching portion 28 includes a base 282 and a protrusion 284. The base 282 includes a flat surface 2822, and the protrusion 284 is formed on the flat surface 2822. The protrusion 284 includes a column 2842 and a beam 2844 connected to each other. The beam 2844 extends toward the button hole 26.

The button 40 includes an operating portion 42, a flat board 44, and a resisting portion 46. The operating portion 42 and the resisting portion 46 are positioned at two opposite sides of the flat board 44.

The elastic plate 50 may comprise a metal plate and includes an arched portion 52 and a fixing portion 53 at each of two opposite ends of the elastic plate 50. The arched portion 52 defines a guiding hole 54 allowing the resisting portion 46 to extend therethrough. Each fixing portion 53 defines a cut out 56 for receiving the corresponding beam 2844.

The fixing board 60 defines a receiving hole 63 and two latching holes 64. The receiving hole 63 is configured for receiving the contact switch 32, and the latching holes 64 are configured for allowing the latching portions 28 of the housing 20 to extend therethrough correspondingly. Each latching hole 64 includes a circular hole 642 corresponding to the column 2842 and a line hole 644 corresponding to the beam 2844. Two blocks 66 protrude from the fixing board 60 and partially surround the circular holes 642 correspondingly.

To assemble the button 40 structure 200, the window 10 is attached to the housing 20, with the through hole 12 aligned with the button hole 26. The operating portion 42 of the button 40 extends through the button hole 26 and the through hole 12 from the inner side of the housing 20 in that order. The elastic plate 50 is then attached to the main housing 20 by engagement of the beams 2844 in the cut outs 56. The resisting portion 46 of the button 40 is received in the guiding hole 54, and the arched portion 52 resists the flat board 44 of the button 40. The fixing board 60 is put on the latching portions 28, with the blocks 66 facing the elastic plate 50 and the protrusions 284 facing the latching holes 64. The fixing board 60 is then pressed down along the protrusions 284 until the blocks 66 contacting the base 282. The fixing portions 53 of the elastic plate 50 are positioned between the base 282 and the fixing board 60. The protrusions 284 partially extend out from the latching holes 64, and are then hot pressed to form two locking portions 286. At last, the switch 30 is received in the receiving hole 63 of the fixing board 60.

In use, the operating portion 42 of the button 40 is pressed down, the flat board 44 pushes the arched portion 52 of the elastic plate 50 to be deformed and move down. The resisting portion 46 of the button 40 presses the switch to produce an electronic signal. When the pressure applied on the operating portion 42 is removed, the arched portion 52 of the metal rebounds to original shape and pushes the button 40 to return to original position.

It is to be understood that the bases 282 may be omitted, and the protrusions 284 are directly formed on the housing 20. In addition, the protrusions 284 may be some other shape (e.g., columnar or line shaped), and the shape of the latching holes 64 and the cut outs 56 are accordingly changed.

It is to be further understood that the latching portions 28 may be omitted, and the fixing board 60 is fixed to the housing 20 by other means (e.g., hot melting or glue). In addition, the fixing board 60 may be omitted, and the elastic plate 50 is directly fixed to the housing 20 by hot melting or glue.

It is to be further understood that the button structure 200 may be positioned at any available area of the housing 20, and it is not necessary to define the through hole 12 in the window 10. The button 40 may directly extend out from the housing 20 via the button hole 26.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A button structure attached to a housing, the housing defining a button hole, the button structure comprising:
   a button including an operating portion and a resisting portion, the operating portion extending out of the housing from the button hole;
   an elastic plate fixed to the housing and located under the button, the elastic plate including an arched portion, the arched portion defining a guiding hole and resisting the button, the resisting portion being received in the guiding hole; and
   a switch, the resisting portion contacting the switch to form an electronic signal when the button is pressed down, the arched portion of the elastic plate pushing the button to return to original position by a rebounding force when the button is released.

2. The button structure as claimed in claim 1, further comprising a fixing board, wherein the fixing board is fixed to the housing and defines a receiving hole for receiving the switch.

3. The button structure as claimed in claim 2, further comprising two latching portions formed on the housing, wherein the latching portions are positioned at two sides of the button hole, and the elastic plate and the fixing board are attached to the latching portions.

4. The button structure as claimed in claim 3, wherein the button comprises a flat board, the operating portion and the resisting portion extend from two opposite sides of the flat board, and the elastic plate is positioned between the flat board and the fixing board.

5. The button structure as claimed in claim 4, wherein each latching portion comprises a protrusion, the elastic plate defines two cut outs at two ends correspondingly, and the elastic plate is attached to the latching portion by engagement of the cut outs and the protrusions.

6. The button structure as claimed in claim 5, wherein the fixing plate defines two latching holes, and the protrusions extend therethrough the latching holes correspondingly.

7. The button structure as claimed in claim 6, wherein each latching portion further comprises a locking portion for preventing the fixing plate from separate from the housing, and the locking portion is formed at one end of the protrusion.

8. The button structure as claimed in claim 7, wherein the locking portions are formed by hot pressing the distal ends of the protrusions correspondingly.

9. The button structure as claimed in claim 5, wherein each latching portion includes a base, and the fixing plate includes two blocks resisting the base.

10. The button structure as claimed in claim 9, wherein the protrusion of the latching portion comprises a column and a beam extending from the column, and the latching hole of the fixing board accordingly includes a circular hole and a line hole.

11. A portable electronic device comprising:
    a housing defining a button hole, two latching portions formed on the housing and positioned at two sides of the button hole;
    a printed circuit board including a contact switch; and
    a button structure including:
    a button including an operating portion and a resisting portion, the operating portion extending out of the housing from the button hole, the resisting portion contacting the switch to form an electronic signal when the button is pressed down;
    an elastic plate attached to the latching portions, the elastic plate including an arched portion and defining a guiding hole, the arched portion resisting the button, the resisting portion being received in the guiding hole, the arched portion of the elastic plate pushing the button to return to original position by a rebounding force when the button is released.

12. The portable electronic device as claimed in claim 11, further comprising a window, wherein the housing defines a cavity receiving the window, and the window defines a through hole corresponding to the button hole of the housing for allowing the button to extend therethrough.

13. The portable electronic device as claimed in claim 12, wherein the housing further includes a frame in the cavity for supporting the window, and the button hole is defined in the frame.

14. The portable electronic device as claimed in claim 11, wherein the button structure further includes a fixing board, and the fixing board is fixed to the housing and defines a receiving hole for receiving the switch.

15. The portable electronic device as claimed in claim 14, wherein the fixing board are attached to the latching portions.

16. The portable electronic device as claimed in claim 15, wherein the button includes a flat board, the operating portion and the resisting portion extend from two opposite sides of the flat board, and the elastic plate is positioned between the flat board and the fixing board.

17. The portable electronic device as claimed in claim 16, wherein each latching portion comprises a protrusion, the elastic plate defines two cut outs at two ends correspondingly, and the elastic plate is attached to the latching portion by engagement of the cut outs and the protrusions.

18. The portable electronic device as claimed in claim 17, wherein the fixing plate defines two latching holes, and the protrusions extend therethrough the latching holes correspondingly.

19. The portable electronic device as claimed in claim 18, wherein each latching portion further comprises a locking portion for preventing the fixing plate from separate from the housing, and the locking portion is formed by hot pressing the distal end of the protrusion.

20. The portable electronic device as claimed in claim 19, wherein each latching portion includes a base, the fixing plate includes two block resisting the base, the protrusion of the latching portion comprises a column and a beam extending from the column, and the latching hole of the fixing board accordingly includes a circular hole and a line hole.

* * * * *